United States Patent
Hattori et al.

(10) Patent No.: US 10,186,383 B2
(45) Date of Patent: Jan. 22, 2019

(54) CAPACITOR

(71) Applicant: Murata Manufacturing Co., Ltd., Nagaokakyo-shi, Kyoto-fu (JP)

(72) Inventors: Kazuo Hattori, Nagaokakyo (JP); Noriyuki Inoue, Nagaokakyo (JP); Takeo Arakawa, Nagaokakyo (JP); Hiromasa Saeki, Nagaokakyo (JP)

(73) Assignee: MURATA MANUFACTURING CO., LTD, Nagaokakyo-Shi, Kyoto-Fu (JP)

( * ) Notice: Subject to any disclaimer, the term of this patent is extended or adjusted under 35 U.S.C. 154(b) by 51 days.

(21) Appl. No.: 15/213,684

(22) Filed: Jul. 19, 2016

(65) Prior Publication Data

US 2016/0329158 A1    Nov. 10, 2016

Related U.S. Application Data

(63) Continuation of application No. PCT/JP2015/050524, filed on Jan. 9, 2015.

(30) Foreign Application Priority Data

Feb. 7, 2014    (JP) ................. 2014-022623

(51) Int. Cl.
*H01G 9/15* (2006.01)
*H01G 9/04* (2006.01)
(Continued)

(52) U.S. Cl.
CPC ............ *H01G 9/15* (2013.01); *H01G 9/0032* (2013.01); *H01G 9/012* (2013.01); *H01G 9/04* (2013.01);
(Continued)

(58) Field of Classification Search
CPC .......... H01G 9/15; H01G 9/045; H01G 9/012; H01G 9/055; H01G 9/145; H01G 4/30; H01G 4/10; H01G 4/12; H01G 4/33
See application file for complete search history.

(56) References Cited

U.S. PATENT DOCUMENTS

| | | |
|---|---|---|
| 8,289,678 B2 | 10/2012 | Kim et al. |
| 8,451,582 B2 | 5/2013 | Sneh et al. |

(Continued)

FOREIGN PATENT DOCUMENTS

| | | |
|---|---|---|
| CN | 101088131 A | 12/2007 |
| CN | 101609749 A | 12/2009 |

(Continued)

OTHER PUBLICATIONS

International Search Report issued for PCT/JP2015/050524, dated Apr. 7, 2015.

(Continued)

*Primary Examiner* — Nguyen Ha
(74) *Attorney, Agent, or Firm* — Arent Fox LLP (57) ABSTRACT

A capacitor that includes a porous metal base material, a dielectric layer formed on the porous metal base material, an upper electrode formed on the dielectric layer, a first terminal electrode electrically connected to the porous metal base material, and a second terminal electrode electrically connected to the upper electrode. The porous metal base material includes a high-porosity part and low-porosity parts, and the low-porosity parts are present at a pair of opposed side surfaces of the porous metal base material.

17 Claims, 9 Drawing Sheets

(51) Int. Cl.
*H01G 9/055* (2006.01)
*H01G 9/012* (2006.01)
*H01G 9/048* (2006.01)
*H01G 9/00* (2006.01)
*H01G 9/045* (2006.01)
*H01G 9/07* (2006.01)

(52) U.S. Cl.
CPC ............ *H01G 9/045* (2013.01); *H01G 9/048* (2013.01); *H01G 9/055* (2013.01); *H01G 9/07* (2013.01)

(56) References Cited

U.S. PATENT DOCUMENTS

| | | | |
|---|---|---|---|
| 8,746,013 | B2 | 6/2014 | Geremew et al. |
| 8,780,532 | B2* | 7/2014 | Kim ........................ H01G 9/012 361/524 |
| 9,552,928 | B2* | 1/2017 | Fujimoto ............. H01G 9/0425 |
| 9,865,400 | B2* | 1/2018 | Ito ............................ H01G 9/07 |
| 2007/0200197 | A1* | 8/2007 | Torres .................... H01G 4/085 257/516 |
| 2008/0094775 | A1 | 4/2008 | Sneh et al. |
| 2008/0304210 | A1* | 12/2008 | Kasuga .................. H01G 9/012 361/528 |
| 2009/0059478 | A1 | 3/2009 | Umemoto et al. |
| 2009/0310283 | A1 | 12/2009 | Kim et al. |
| 2010/0143601 | A1 | 6/2010 | Hawtof et al. |
| 2010/0165547 | A1* | 7/2010 | Kuranuki ............... H01G 9/012 361/525 |
| 2011/0038094 | A1 | 2/2011 | Mori et al. |
| 2011/0310526 | A1 | 12/2011 | Sneh et al. |
| 2012/0060909 | A1* | 3/2012 | Nagata ................ H01G 9/2068 136/256 |
| 2012/0099242 | A1* | 4/2012 | Ohyama ................ H01G 9/012 361/303 |
| 2012/0120554 | A1 | 5/2012 | Kim et al. |
| 2012/0300360 | A1* | 11/2012 | Take ........................ H01G 4/30 361/301.4 |
| 2013/0216849 | A1 | 8/2013 | Matsunaga et al. |
| 2013/0321984 | A1* | 12/2013 | Masuda ................... H01G 9/15 361/524 |

FOREIGN PATENT DOCUMENTS

| | | |
|---|---|---|
| JP | S49-68256 A | 7/1974 |
| JP | H1-113328 U | 7/1989 |
| JP | H9-74051 A | 3/1997 |
| JP | H1050564 A | 2/1998 |
| JP | H11-340091 A | 12/1999 |
| JP | 3294362 B2 | 6/2002 |
| JP | 2005-276923 A | 10/2005 |
| JP | 2009054906 A | 3/2009 |
| JP | 2009302499 A | 12/2009 |
| JP | 2010165701 A | 7/2010 |
| JP | 2010-526978 A | 8/2010 |
| JP | 2010171256 A | 8/2010 |
| JP | 2011-83448 A | 4/2011 |
| JP | 2011-165683 A | 8/2011 |
| JP | 2011-192947 A | 9/2011 |
| JP | 2012104795 A | 5/2012 |
| JP | 2012-144790 A | 8/2012 |
| JP | 2012-517717 A | 8/2012 |
| JP | 5294900 B2 | 9/2013 |
| KR | 10-2009-0131053 A | 12/2009 |

OTHER PUBLICATIONS

Written Opinion of the International Searching Authority issued for PCT/JP2015/050524, dated Apr. 7, 2015.

* cited by examiner

CAPACITOR

CROSS REFERENCE TO RELATED APPLICATIONS

The present application is a continuation of International application No. PCT/JP2015/050524, filed Jan. 9, 2015, which claims priority to Japanese Patent Application No. 2014-022623, filed Feb. 7, 2014, the entire contents of each of which are incorporated herein by reference.

FIELD OF THE INVENTION

The present invention relates to a capacitor and a manufacturing method therefor.

BACKGROUND OF THE INVENTION

Conventionally, known as a solid electrolytic capacitor is a capacitor including a valve metal such as niobium, tantalum, titanium, or aluminum, or an alloy thereof as an anode, an oxide film formed at the surface of the anode as a dielectric layer, and an electrolyte layer formed on the dielectric layer. However, there have been problems of increased equivalent series resistance (ESR) when manganese dioxide is used as the electrolyte layer; and increased leakage current when an electrically conductive polymer is used as the electrolyte layer.

Patent Document 1 discloses, as a solid electrolytic capacitor which is low in ESR and leakage current, a solid electrolytic capacitor including: an anode formed by making a valve metal powder shaped and sintered; a dielectric layer formed on the surface of the anode; a cathode formed on the dielectric layer; and an exterior resin covering the anode, the dielectric layer, and the cathode.

Patent Document 1: Japanese Patent Application Laid-Open No. 2009-54906

SUMMARY OF THE INVENTION

The solid electrolytic capacitor as described in Patent Document 1 has an anode composed of a sintered body of a valve metal powder such as niobium, tantalum, titanium, or aluminum. This sintered body is a high-porosity porous body, thus able to acquire high electrostatic capacitance, but low in mechanical strength. Therefore, in order to ensure such strength that allows for mounting onto a circuit board, there is a need for coating with an exterior resin as described in Patent Document 1.

An object of the present invention is to provide a capacitor which can achieve high electrostatic capacitance, and is small in leakage current, with excellent mechanical strength.

The inventors have found, as a result of carrying out earnest studies in order to solve the problem mentioned above, that a capacitor which has excellent mechanical strength can be provided, by forming a low-porosity part partially in a porous metal base material being a high-porosity part.

According to a first aspect of the present invention, a capacitor is provided which includes a porous metal base material; a dielectric layer formed on the porous metal base material; an upper electrode formed on the dielectric layer; a first terminal electrode electrically connected to the porous metal base material; and a second terminal electrode electrically connected to the upper electrode. The porous metal base material includes a high-porosity part and low-porosity parts, and the low-porosity parts are present at least at a pair of opposed side surface parts of the porous metal base material.

According to a second aspect of the present invention, a method for manufacturing a capacitor is provided. The method includes the steps of preparing a porous metal base material including a high-porosity part and a low-porosity part; forming a dielectric layer on the porous metal base material; forming an upper electrode on the dielectric layer; forming a first terminal electrode to be electrically connected to the porous metal base material; and forming a second terminal electrode to be electrically connected to the upper electrode.

According to the present invention, the use of the porous metal base material including the high-porosity part and the low-porosity part provides a capacitor with improved mechanical strength.

BRIEF EXPLANATION OF THE DRAWINGS

FIGS. 3-1(a) to 3-1(d) are diagrams illustrating steps of manufacturing the capacitor in FIG. 1.

FIGS. 3-2(e) to 3-2(h) are, following FIG. 3-1(a) to 3-1(d), diagrams illustrating steps of manufacturing the capacitor in FIG. 1.

FIGS. 3-3(i) to 3-3(m) are, following FIG. 3-2(e) to 3-2(h), diagrams illustrating steps of manufacturing the capacitor in FIG. 1.

DETAILED DESCRIPTION OF THE INVENTION

A capacitor according to the present invention will be described in detail below with reference to the drawings. However, the capacitor according to the present embodiment and the shapes and arrangement of respective constructional elements are not limited to those in the examples shown in the figures.

Figure 1:
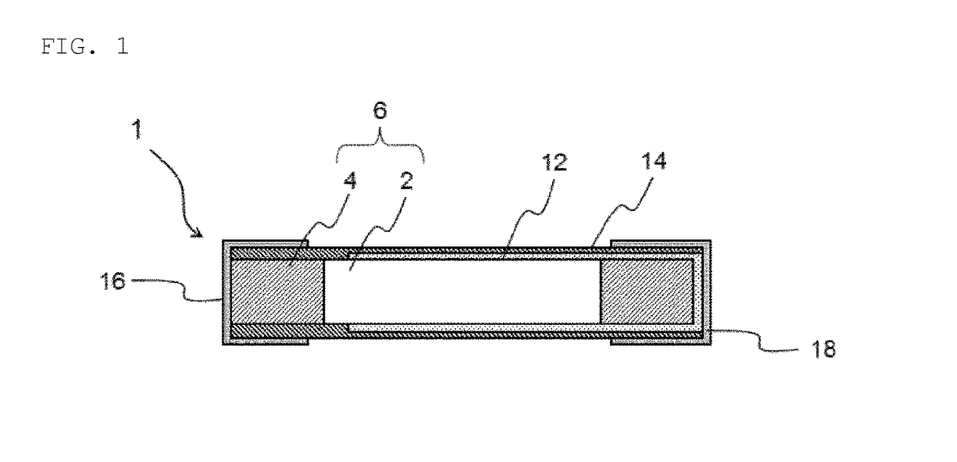
FIG. 1 is a schematic cross-sectional view of a capacitor according to an embodiment of the present invention.
Figures 1A, 3:
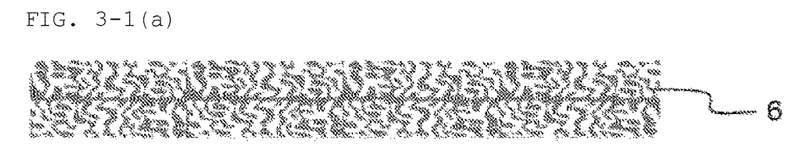
Figures 1B, 3:
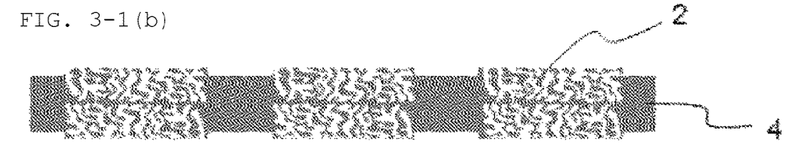
Figures 1C, 3:
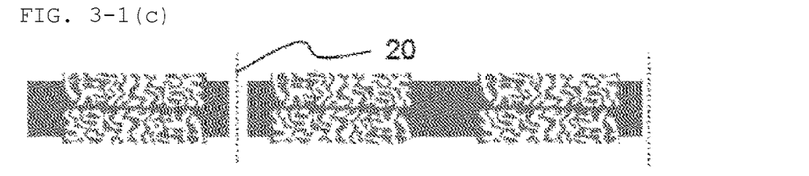
Figures 1D, 3:
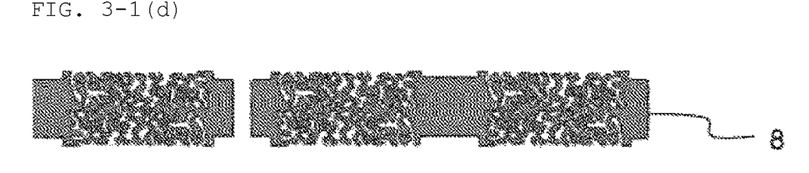
Figure 2A:
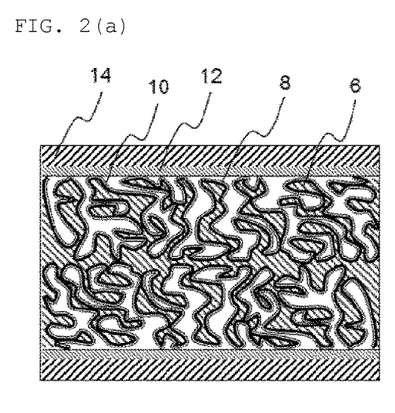
FIG. 2(a) is an enlarged view of a high-porosity part in the cross-sectional view shown in FIG. 1.

The capacitor 1 according to the present embodiment has a substantially cuboid shape, and mainly has the porous metal base material 6, as shown in FIG. 1 and FIG. 2(a), including a high-porosity part 2 in the center thereof and low-porosity parts 4 along side surfaces thereof, a dielectric layer 8 formed thereon, an upper electrode 10 formed on the dielectric layer 8, a wiring electrode 12 formed thereon to be electrically connected to the upper electrode 10, and further a protective film 14 formed thereon. On side surfaces of the porous metal base material 6, a first terminal electrode 16 and a second terminal electrode 18 are provided to be opposed, and the first terminal electrode 16 is electrically connected to the porous metal base material 6, whereas the second terminal electrode 18 is electrically connected to the upper electrode 10 through the wiring electrode 12.

In this specification, the "porosity" of the porous metal base material refers to the proportion of voids in the porous metal base material. The porosity can be measured in the following way.

First, the porous metal base material is processed by focused ion beam (FIB: Focused Ion Beam) processing into a thin section of 60 nm or less in thickness. A predetermined region (5 μm×5 μm) of this thin section sample is photographed with the use of a transmission electron microscope (TEM: Transmission Electron Microscope). The obtained image is subjected to image analysis, thereby finding the area where a metal of the porous metal base material is present. Then, the porosity can be calculated from the following equality.

Porosity=(Measured Area−Area where Metal of Base Material is Present)/Measured Area In this specification, the "high-porosity part" of the porous metal base material refers to a region where the porosity is 25% or more.

In this specification, the "low-porosity part" of the porous metal base material refers to a site where the porosity is low as compared with the high-porosity part, specifically, a region that is 70% or less of the high-porosity part in terms of porosity.

In this specification, the "side surface" of the porous metal base material refers to any surface substantially perpendicular to the mounting surface of the capacitor. It is to be noted that the lower surface is considered as the mounting surface of the capacitor in FIGS. 1 to 10(e).

The metal constituting the porous metal base material mentioned above is not particularly limited as long as the metal is conductive, but examples thereof include metals such as aluminum, tantalum, nickel, copper, titanium, niobium, and iron, and alloys such as stainless steel and duralumin.

Preferred porous metal base materials, which are not to be considered particularly limited, include aluminum etching foil, a sintered body of tantalum powder, a sintered body of nickel powder, and porous metals synthesized by a dealloying method.

The porous metal base material can be prepared by a method well known in the art, such as etching, sintering, and dealloying methods. In addition, a commercially available porous metal base material may be used for the porous metal base material.

The thickness of the porous metal base material is not particularly limited, but can be appropriately selected for any purpose, and may be, for example, 10 to 1,000 μm, preferably 30 to 300 μm. It is to be noted that the thickness of the porous metal base material refers to a length in a direction perpendicular to the mounting surface of the capacitor. The thickness made 1,000 μm or less is advantageous in terms of reduction in size. On the other hand, the thickness made 10 μm or more can further sufficiently ensure the strength of the porous metal base material.

As shown in FIG. 1, the porous metal base material 6 has, at opposed side surfaces thereof, the low-porosity parts 4, and the high-porosity part 2 therebetween.

The porosity of the high-porosity part of the porous metal base material is preferably 30% or more, and more preferably 35% or more, from the perspective of increasing the surface area to increase the capacitance of the capacitor. In addition, the porosity is preferably 80% or less, and more preferably 65% or less, from the perspective of ensuring mechanical strength.

The porosity of the low-porosity part of the porous metal base material is preferably 60% or less of the porosity of the high-porosity part, and more preferably 50% or less of the porosity of the high-porosity part, from the perspective of increasing the mechanical strength. For example, the porosity of the low-porosity part is preferably 20% or less, and more preferably 10% or less. In addition, the low-porosity parts may have a porosity of 0%.

The low-porosity parts are located at opposed side surfaces of the porous metal base material. In this regard, the "side surface" of the porous metal base material includes the side surface of the porous metal base material, and means a region within a certain distance from the side surface. More specifically, a part of the low-porosity part may constitute at least a part of the side surfaces of the porous metal base material. For example, a part of the low-porosity part preferably constitutes at least 30% or more region, more preferably 60% or more region of the side surfaces of the porous metal base material. Further preferably, a part of the low-porosity part constitutes the entire region of the side surfaces of the porous metal base material. In other words, the side surfaces of the porous metal base material are composed of the low-porosity part.

The low-porosity parts are 3 μm to 1 mm, preferably 10 to 500 μm in width (the length from a side surface in common with the side surface of the porous metal base material to a surface opposed to the side surface; the horizontal length on page in FIGS. 1 to 10(e)). The low-porosity part made 3 μm or more, more preferably 10 μm or more in width can increase the mechanical strength of the capacitor. In addition, the low-porosity part made 1 mm or less in width makes it possible to ensure a larger high-porosity part in an equal volume of porous metal member, thereby making it possible to achieve high electrostatic capacitance.

The method for forming the low-porosity part is not particularly limited as long as a desired porosity can be achieved, but the low-porosity part is preferably formed, for example, by pressing with a mold or the like. The pressing may be carried out in such a way that the porous metal base material is subjected to pressing so as to be sandwiched from the upper and lower surfaces of the porous metal base material, or subjected to pressing from only one of the surfaces.

Alternatively, as another method, a porous metal base material made porous in advance may be irradiated with a $YVO_4$ laser, a $CO_2$ laser, a YAG laser, an excimer laser, and an all-solid-state pulsed laser such as a femtosecond laser, a picosecond laser, and a nanosecond laser, to fill pores, thereby forming the low-porosity part. All-solid-state pulsed lasers such as a femtosecond laser, a picosecond laser, and a nanosecond laser are preferred, because the shape and porosity of the low-porosity part can be controlled with more precision.

The low-porosity part may be formed by filling pores of the high-porosity part as mentioned above, but can be also formed in the process of forming pores in a metal base material that is not made porous. For example, in the case of preparing porous metal foil by etching, sites where the low-porosity part is to be formed are subjected to masking, and then etching, thereby causing the masked sites to serve as non-etched layers, and thus forming the low-porosity part. Alternatively, as in the embodiment shown FIG. 6(a) as described below, in the case of forming a low-porosity part in a central part of foil, etching is stopped before pores are formed in the central part of the foil, thereby causing the central part to serve as a non-etched layer, and thus forming the low-porosity part.

Low-porosity parts in various shapes can be formed by combining the pressing, laser processing, and formation of non-etching layers as mentioned above.

In the capacitor 1, the dielectric layer 8 is formed on the porous metal base material 6 described above.

The material that forms the dielectric layer mentioned above is not particularly limited as long as the material has an insulating property, but examples thereof preferably include metal oxides such as $AlO_x$ (e.g., $Al_2O_3$), $SiO_x$ (e.g., $SiO_2$), $AlTiO_x$, $SiTiO_x$, $HfO_x$, $TaO_x$, $ZrO_x$, $HfSiOx$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; or metal oxynitrides such as $AlO_xN_y$, $SiO_xN_y$, $HfSiO_xN_y$, and $SiC_xO_yN_z$, and $AlO_x$, $SiO_x$, $SiO_xN_y$, and $HfSiO_x$ are preferred. It is to be noted that the formulas mentioned above are merely intended to represent the constitutions of the materials, but not intended to limit the compositions. More specifically, the x, y, and z attached to O and N may have any value, and the respective elements including the metal elements may have any presence proportion.

The thickness of the dielectric layer is not particularly limited, but for example, preferably 5 to 100 nm, and more preferably 10 to 50 nm. The thickness of the dielectric layer, which is made 5 nm or more, can enhance the insulating property, thereby making it possible to reduce leakage current. In addition, the thickness of the dielectric layer, which is made 100 nm or less, makes it possible to obtain higher electrostatic capacitance.

The dielectric layer can be formed by an atomic layer deposition (ALD: Atomic Layer Deposition) method. The use of the ALD method can form a highly insulating dielectric layer which is small in thickness and small in leakage current, thus making it possible to further increase the capacitance of the capacitor.

In the capacitor 1, the upper electrode 10 is formed on the dielectric layer 8.

The material constituting the upper electrode is not particularly limited as long as the material is conductive, but examples thereof include Ni, Cu, Al, W, Ti, Ag, Au, Pt, Zn, Sn, Pb, Fe, Cr, Mo, Ru, Pd, and Ta and alloy layers thereof, e.g., CuNi, AuNi, AuSn, and metal nitrides such as TiN, TiAlN, TiON, TiAlON, TaN, and TiN and TiON are preferred. In addition, the material constituting the upper electrode may be an electrically conductive polymer, and examples thereof include PEDOT/PSS (poly(3,4-ethylenedioxythiophene)/polystyrene sulfonic acid), polyaniline, and polypyrrole.

The thickness of the upper electrode is not particularly limited, but for example, preferably 3 nm or more, and more preferably 10 nm or more. The thickness of the upper electrode, which is made 3 nm or more, can reduce the resistance of the upper electrode itself.

The upper electrode can be formed by an ALD method. The use of the ALD method can further increase the capacitance of the capacitor. The upper electrode may be formed by, as another method, a method such as a chemical vapor deposition (CVD: Chemical Vapor Deposition) method, plating, bias sputtering, Sol-Gel, or an electrically conductive polymer filling, which can coat the dielectric layer, and substantially fill pores of the porous metal base material. Alternatively, a conductive film may be formed by an ALD method on the dielectric layer, and pores may be filled thereon by other approach, thereby forming the upper electrode.

It is to be noted that when the upper electrode fails to have sufficient conductivity as a capacitor electrode after the formation of the upper electrode, an extended electrode layer of Al, Cu, Ni, or the like may be additionally formed on the surface of the upper electrode by a method such as sputtering, vapor deposition, or plating.

Figure 2B:
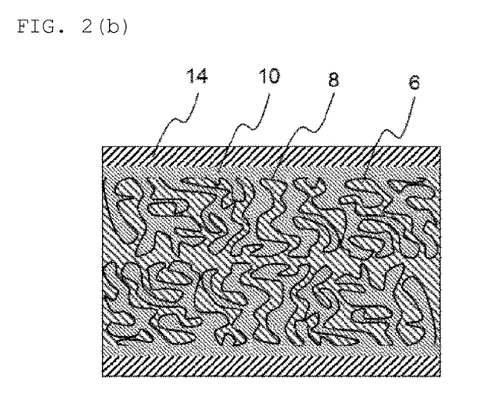
FIG. 2(b) is an enlarged view of a high-porosity part according to another aspect.
Figures 2E, 3:
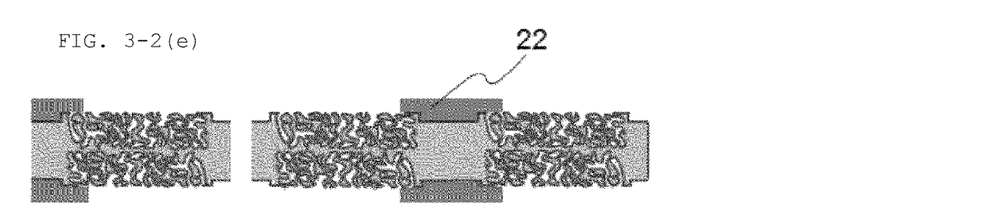
Figures 2F, 3:
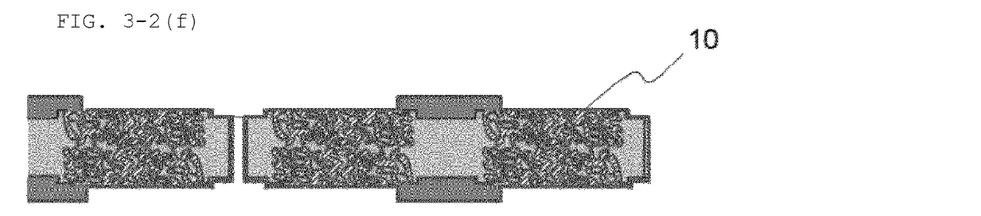
Figures 2G, 3:
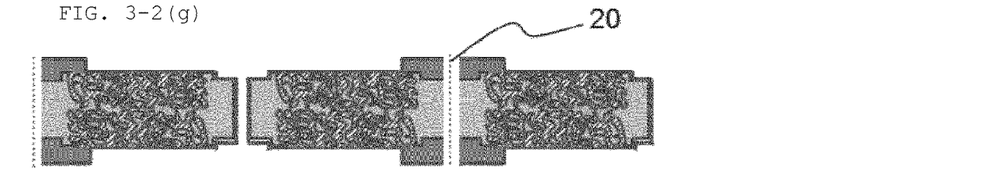
Figures 2H, 3:
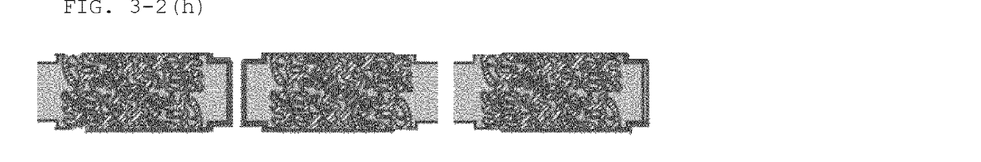
Figures 3, 3I:
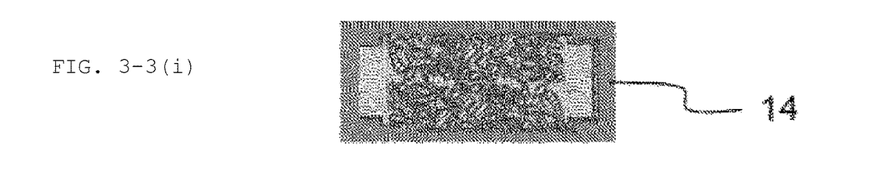
Figures 3, 3J:
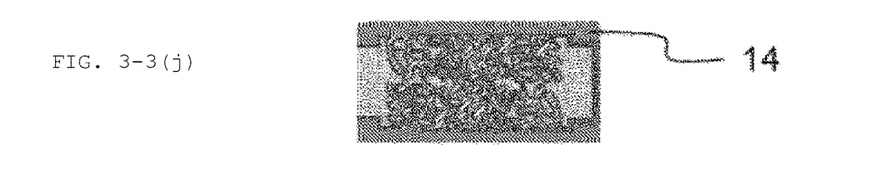
Figures 3, 3K:
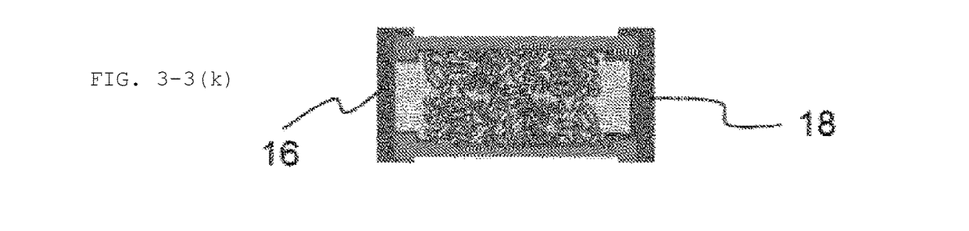
Figures 3, 3L:
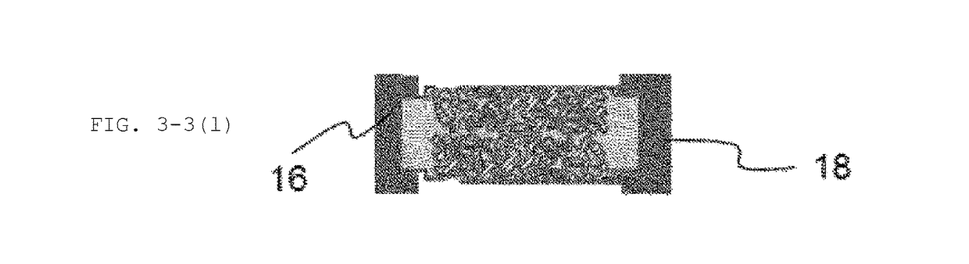
Figures 3, 3M:
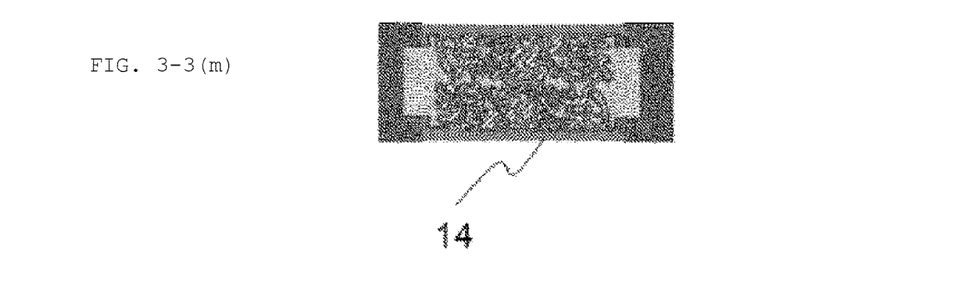

In an embodiment of the present invention, as shown in FIG. 2(b), the upper electrode 10 may be formed such that the conductive substance constituting the upper electrode fills pores of the porous metal base material 6. In this embodiment, the upper electrode 10 may also serve as the following wiring electrode. It is to be noted that there is no need for the conductive substance to substantially completely fill pores of the porous metal base material, but it is enough to just fill 50% or more, preferably 70% or more, more preferably 90% or more of the pores. From the perspective of reducing the resistance of the upper electrode, the pores are preferably filled substantially completely.

In the capacitor 1, the wiring electrode 12 is formed on the upper electrode 10.

The material constituting the wiring electrode is not particularly limited, but examples thereof include Cu, Ni, Sn, Al, Ag, and Au. The method for forming the wiring electrode is not particularly limited, but for example, a CVD method, plating, sputtering and the like can be used.

In the capacitor 1, the protective layer 14 protects the porous metal base material with the dielectric layer 8, upper electrode 10, and wiring electrode 12 formed.

Preferably, the protective layer 14 is formed to cover the entire porous metal base material mentioned above, except for parts connected to the terminal electrodes. The protective layer can further enhance the moisture resistance, insulating property, and mechanical strength of the capacitor.

The material constituting the protective layer is not particularly limited as long as the material has an insulating property, but for example, the same material as that for forming the dielectric layer, preferably $SiN_x$, $SiO_x$, $AlTiO_x$, and $AlO_x$, more preferably $SiO_x$, or a resin coating such as polyepoxy or polyimide, or a glass coating can be used.

The thickness of the protective layer is not particularly limited as long as the thickness can achieve a desired function, for example, moisture resistance or an insulating property, but for example, 0.5 μm to 50 μm, and preferably 1 μm to 20 μm.

The method for forming the protective layer is not particularly limited, but can be appropriately selected depending on the material, such as, for example, a CVD method, plating, sputtering, spraying, screen printing, a dispenser, or resin film laminating.

The capacitor 1 has, at side surfaces thereof, the pair of first terminal electrode 16 and second terminal electrode 18 opposed.

The first terminal electrode 16 is electrically connected to the porous metal base material 6, the second terminal electrode 18 is electrically connected to the upper electrode 10, and the first terminal electrode and the second terminal electrode are disposed to be electrically insulated in the capacitor.

The materials constituting the first terminal electrode and the second terminal electrode (hereinafter, also referred to collectively as "terminal electrodes") are not particularly limited as long as the materials are conductive, but for example, metals such as Cu, Ni, Sn, Au, Ag, and Pb and alloys thereof can be used.

The thicknesses of the terminal electrodes are not particularly limited, but may be 1 to 50 μm, and preferably 1 to 20 μm.

The method for forming the terminal electrodes is not particularly limited, but the electrodes may be formed by, for example, plating, or, applying and baking a conductive paste.

The porous metal base material of this type of capacitor has a low-porosity part with high mechanical strength, and thus has high durability against, for example, stress applied in mounting to a substrate such as a glass epoxy substrate, a ceramic substrate or a resin substrate, in particular, deflection stress. In addition, also in the manufacturing steps after forming the dielectric layer, the deformation of the porous metal base material during the manufacture can be suppressed because the low-porosity part has high mechanical strength.

In addition, while the ALD method as mentioned above makes it possible to form a thin film which has a highly insulating property, the obtained dielectric film is low in interface intensity (or adhesion) between the dielectric film and the porous metal base material, and likely to generate separation, delamination, and cracks due to stress. The capacitor according to the present invention is high in mechanical strength, and thus able to suppress separation and delamination of the dielectric film and generation of cracks due to deformations of the element.

This improvement in mechanical strength makes it possible to achieve a lower-profile capacitor. For example, the capacitor according to the present invention allows the ratio of the length to the thickness to be made 3 or more, preferably 4 or more.

The above-described capacitor 1 according to the present embodiment can be manufactured by the following manufacturing process.

As shown in FIG. 3-1(a), the porous metal base material 6 is first prepared. As mentioned above, the porous metal base material can be prepared by a method well known in the art, such as etching, sintering, and a dealloying method. In addition, a commercially available porous metal base material may be used for the porous metal base material.

Next, as shown in FIG. 3-1(b), the low-porosity part 4 is formed for the porous metal base material 6. One porous metal base material has more than one low-porosity part formed at an interval depending on the size of a desired capacitor. More specifically, more than one element is formed from the porous metal base material. The low-porosity part can be formed as described above by, for example, pressing with a mold or the like, or a $CO_2$ layer, a YAG laser, an excimer laser, and an all-solid-state pulsed laser such as a femtosecond laser, a picosecond laser, and a nanosecond laser.

Next, as shown in FIG. 3-1(c), the porous metal base material is cut along a dashed line 20 in the low-porosity part (preferably, in a substantially central part thereof). However, at this point, the porous metal base material is not completely cut into element units, but kept with one side surface coupled to the adjacent element.

The method for cutting the porous metal base material is not particularly limited, but, the material can be cut by a single one or combination of, for example, a laser, punching through a mold, cutting with a dicer, a carbide blade, a slitter, or a pinnacle blade.

The manufacture of the capacitor according to the present invention includes a step of cutting the porous metal base material as mentioned above. In general, the presence of a porous site causes, in the cutting, the generation of shear drop, such as burr and/or drawing/deformation in the cutting direction along the cut surface. However, the method for manufacturing a capacitor according to the present invention makes it possible to suppress the generation of such burr, because the part to be cut is the low-porosity part.

Next, as shown in FIG. 3-1(d), the dielectric layer 8 is formed on the surface of the porous metal base material 6 (entirely on the exposed surface of the porous metal substrate in the example shown). The dielectric layer is formed by an ALD method as described above.

Next, as shown in FIG. 3-2(e), a mask 22 is formed on a part of the porous metal base material with the dielectric layer 8 formed, specifically on a site on which the first terminal electrode 16 is to be formed later.

The material constituting the mask is not particularly limited, but examples thereof include epoxy resins, polyimide resins, and silicone resins.

The method for forming the mask is not particularly limited, but examples thereof include screen printing, a dispenser, dipping, ink-jet printing, and spraying.

Next, as shown in FIG. 3-2(f), the upper electrode 10 is formed on the dielectric layer 8. In the example shown, as exemplified in FIG. 2(b), a conductive substance layer to serve as the upper electrode is formed so as to cover the entire element, and the upper electrode also serves as the wiring electrode.

The upper electrode can be formed by a method such as an ALD method, a CVD method, plating, bias sputtering, Sol-Gel, or electrically conductive polymer filling. In addition, these methods can be used in combination. For example, a conductive film may be formed by an ALD method on the dielectric layer, and pores may be filled thereon by other method, thereby forming the upper electrode.

Next, as shown in FIG. 3-2(g), the porous metal base material is cut in the low-porosity part with the mask formed (preferably in a substantially central part thereof), and divided into respective element units. As a method for the cutting, the same method as for the cutting in FIG. 3-1(c) can be used.

Next, as shown in FIG. 3-2(h), the mask is removed. The mask can be removed by an appropriate method depending on the material constituting the mask, etc., and removed by, for example, cleaning or heat treatment.

Next, as shown in FIG. 3-3(i), the protective layer 14 is formed so as to cover the entire element. As mentioned above, the protective layer can be formed by, for example, a CVD method, plating, sputtering, spraying, or printing.

Next, as shown in FIG. 3-3(j), a part of the protective layer, specifically, sites on which the terminal electrodes are to be formed are etched to expose the porous metal base material 6 (the left side surface in the figure) and the upper electrode 10 (the right side surface in the figure).

Finally, as shown in FIG. 3-3(k), the first terminal electrode 16 and the second terminal electrode 18 are formed.

The first terminal electrode 16 is formed so as to be electrically connected to the porous metal base material 6, and electrically isolated from the upper electrode 10. The second terminal electrode 18 is formed so as to be electrically connected to the upper electrode 10, and electrically isolated from the porous metal base material 6. The terminal electrodes may be formed as mentioned above by plating, or formed by applying and baking or curing a conductive paste.

As for the formation of the protective layer and the terminal electrodes, as another method, as shown in FIG. 3-3(*l*), the first terminal electrode and the second terminal electrode may be formed first, and then, as shown in FIG. 3-3(*m*), the protective film may be formed so as to expose the first terminal electrode and the second terminal electrode.

While the capacitor and manufacturing method therefor according to the present invention have been described above with reference to the capacitor 1 according to the embodiment, the present invention is not to be considered limited thereto, but various modifications can be made.

Figure 4:
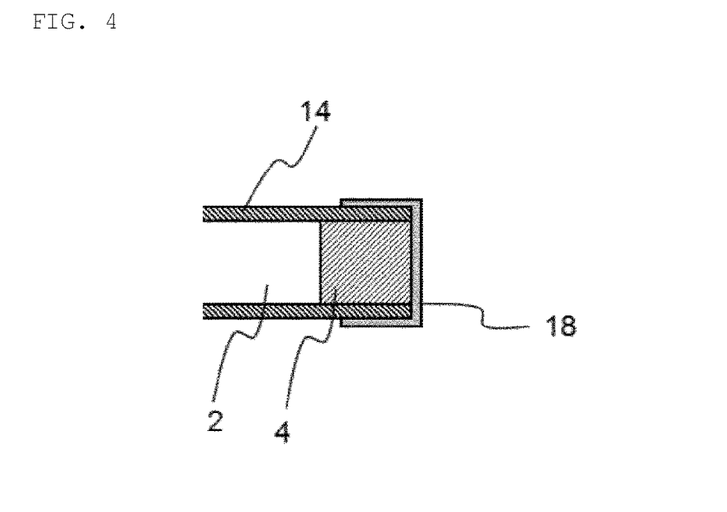
FIG. 4 is a schematic enlarged cross-sectional view of a second terminal electrode part of a capacitor according to a preferred embodiment of the present invention.

In a preferred embodiment of the present invention, the first terminal electrode and the second terminal electrode are located on the pair of opposed side surfaces provided with the low-porosity part of the porous metal base material, and each formed to extend from the side surface of the porous metal base material onto the low-porosity part at the upper and lower surfaces. Specifically, as shown in FIG. 4 (the second terminal electrode 18 is shown representatively in FIG. 4), the first and/or second terminal electrodes, more preferably, all of the terminal electrodes are formed to be entirely located on the low-porosity part 4. The terminal electrodes are often projected outwardly more than the other sites, and the stress applied when the capacitor is mounted and prepared is likely to be concentrated in particular, on ends of the terminal electrodes. Therefore, the low-porosity part with high mechanical strength just under the terminal electrodes can further increase the mechanical strength of the overall capacitor.

Figure 5:
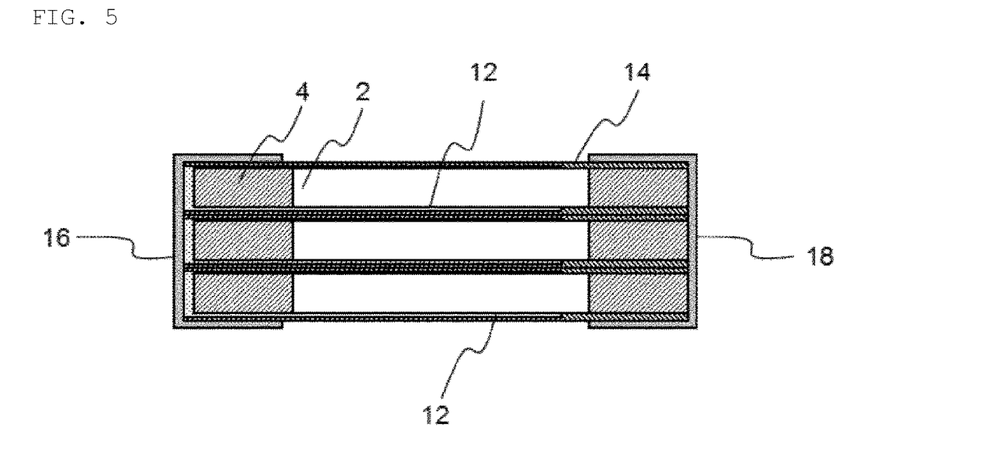
FIG. 5 is a schematic cross-sectional view of a capacitor according to yet another embodiment of the present invention.

In yet another embodiment of the present invention, as shown in FIG. 5, the multiple elements obtained by the cutting in FIG. 3-2(*h*), for example, three of the elements may be stacked to provide a stacked body, and thereafter, this stacked body may be subjected to the steps in FIGS. 3-3(*i*) to 3-3(*k*) to form the protective layers and the terminal electrodes. This constitution can further increase the mechanical strength and capacitance of the capacitor.

In yet another embodiment of the present invention, the capacitor according to the present invention may have an additional low-porosity part formed between the low-porosity part present at the opposed side surfaces of the porous metal base material (hereinafter, also simply referred to as "additional low-porosity part" and "side-surface low-porosity parts", respectively).

Figures 6A, 6B:
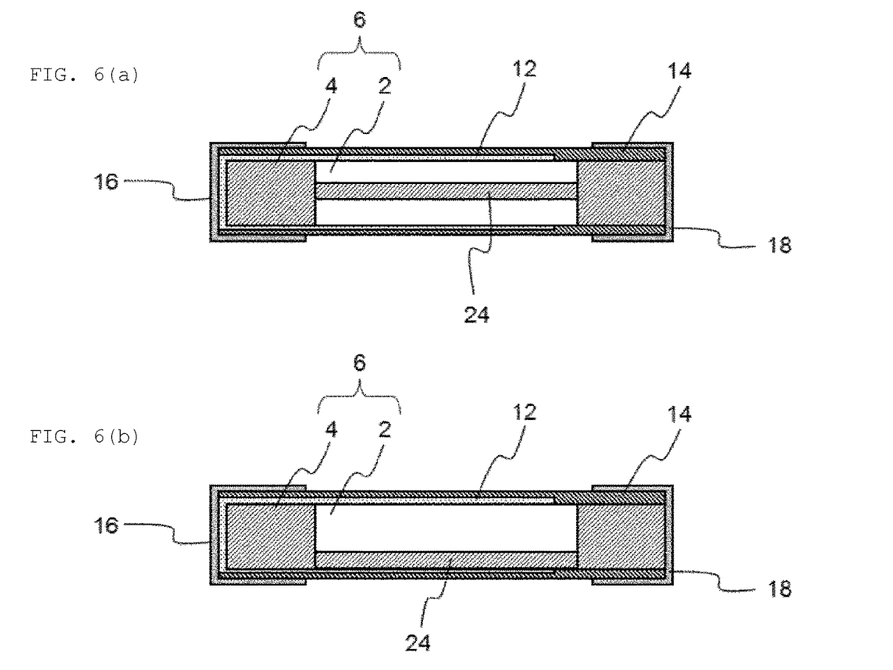
FIGS. 6(a) and 6(b) are schematic cross-sectional views of capacitors according to yet other embodiments of the present invention.

The additional low-porosity part mentioned above may be, as shown in FIGS. 6(*a*) and 6(*b*), formed so as to connect the side-surface low-porosity parts. This additional low-porosity part 24 as a connecting part may be located anywhere in the thickness direction of the porous metal base material, and for example, may be located near the center in the thickness direction of the porous metal base material (FIG. 6(*a*)), or located so as to be brought into contact with the upper surface or lower surface of the porous metal base material (FIG. 6(*b*)).

Figure 7:
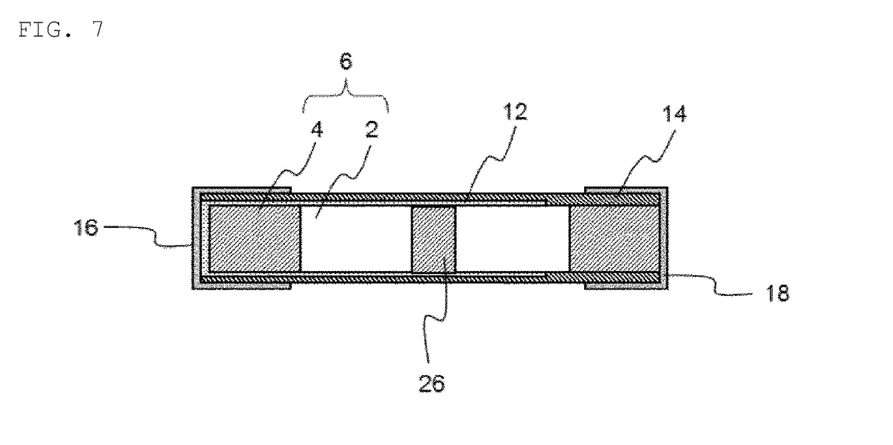
FIG. 7 is a schematic cross-sectional view of a capacitor according to yet another embodiment of the present invention.

Alternatively, the additional low-porosity part may be, as shown in FIG. 7, separated from the low-porosity parts present at the pair of opposed side surface parts of the porous metal base material, and formed to cover from the upper surface of the porous metal base material to the lower surface thereof. This columnar additional low-porosity part 26 may be located in any position of the porous metal base material, but is preferably located in a central part thereof as shown.

In addition, the additional low-porosity part may be completely covered with the high-porosity part of the porous metal base material, and in other words, may be located so as to be buried in the high-porosity part.

As for the additional low-porosity part, only one additional low-porosity part may be present, or two or more may be present.

Figure 8A:
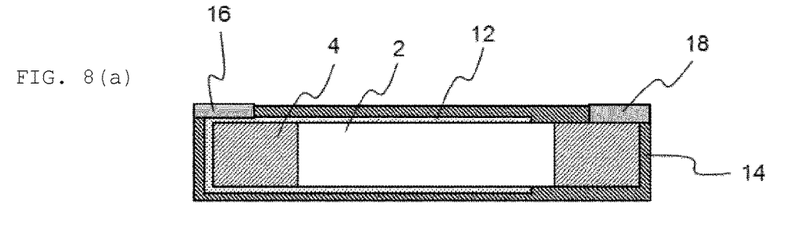
FIGS. 8(a) and 8(b) are schematic cross-sectional views of capacitors according to yet other embodiments of the present invention.
Figure 8B:
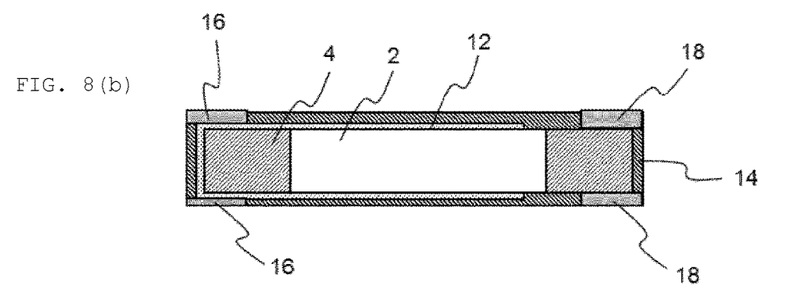

In another aspect of the present invention, as shown in FIG. 8(*a*), the first terminal electrode and the second terminal electrode may present only on the upper surface, without being present on the side surfaces of the element. Alternatively, as shown in FIG. 8(*b*), the terminal electrodes may be present on both the upper surface and the lower surface.

Figure 9A:
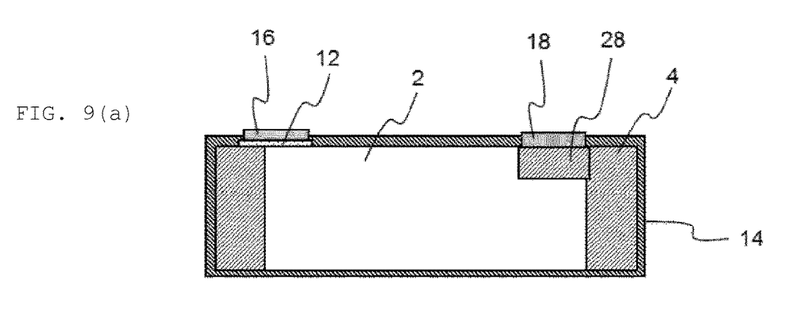
FIGS. 9(a) and 9(b) are schematic cross-sectional views of capacitors according to yet other embodiments of the present invention.

In yet another embodiment of the present invention, as shown in FIG. 9(*a*), in addition to low-porosity parts 4 present at a pair of opposed side surface parts of a porous metal base material, at least one low-porosity part 28 may be formed in a part of an upper surface part of the porous metal base material, and a terminal electrode may be formed on the low-porosity part 28 formed at the upper surface part. While only the second terminal electrode 18 is located on the low-porosity part 28 in the example shown, a low-porosity part may be formed only below the first terminal electrode 16, or low-porosity parts may be formed below both of the first terminal electrode 16 and the second terminal electrode 18. This configuration can reduce the distance between the terminals, thus making it possible to reduce the value of the equivalent series resistance.

In this embodiment, preferably, at least one of the first terminal electrode and the second terminal electrode is formed such that the entire terminal electrode is present on the low-porosity part. The formation of the entire terminal electrode on the low-porosity part increases the mechanical strength around the terminal electrode on which stress is likely to be concentrated, thus making it possible to increase the mechanical strength of the overall capacitor.

Figure 9B:
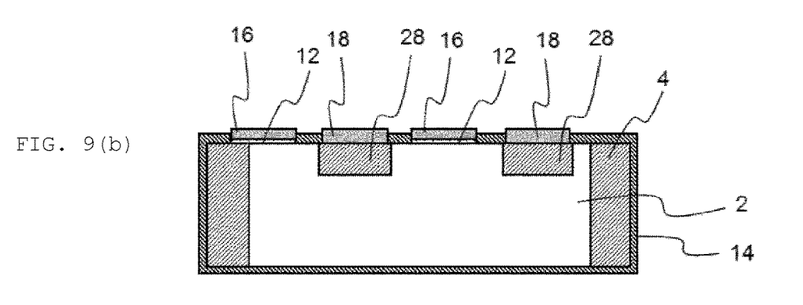
Figure 10A:
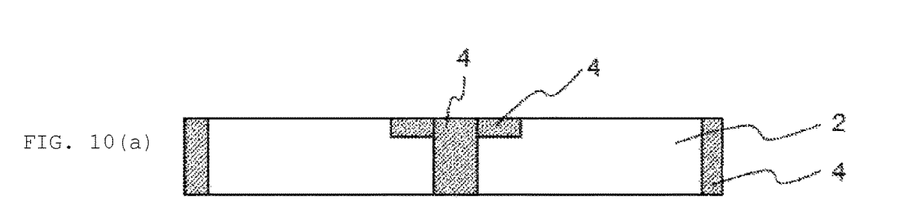
FIGS. 10(a) to 10(e) are diagrams illustrating steps of manufacturing the capacitor in FIG. 9(a).
Figure 10B:
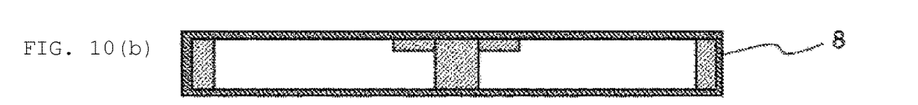
Figure 10C:
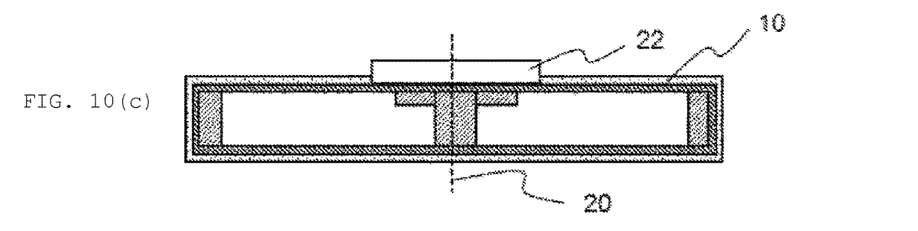
Figure 10D:
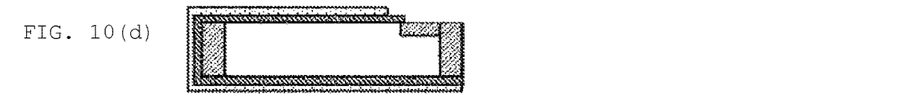
Figure 10E:
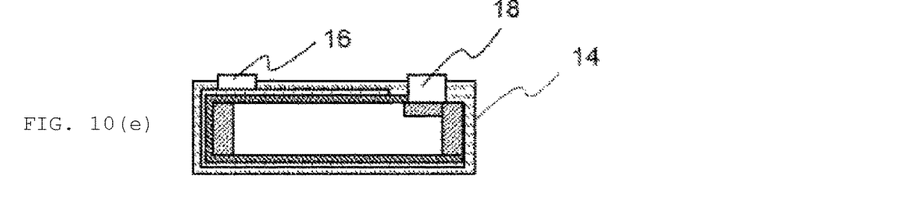

In addition, while there is the pair of first terminal electrode and second terminal electrode in FIG. 9(*a*), two pairs of first terminal electrode and second terminal electrode may be formed as shown in FIG. 9(*b*). This configuration can further reduce the value of the equivalent series resistance.

The capacitor according to the embodiment as shown in FIG. 9(*a*) can be formed, for example, as shown in FIG. 10(*a*) to 10(*e*).

First, as shown in FIG. 10(*a*), the low-porosity parts 4 are formed in predetermined positions of a porous metal base material.

Next, as shown in FIG. 10(*b*), a dielectric layer 8 is formed on the porous metal base material.

Next, as shown in FIG. 10(*c*), a mask 22 is applied to a site where a first terminal electrode is to be formed, and an upper electrode 10 is then formed.

Next, as shown in FIG. 10(*d*), cutting is carried out in the low-porosity part along a dashed line 20, and the mask is removed.

Next, as shown in FIG. 10(*e*), the first terminal electrode 16 and the second terminal electrode 18 are formed, and finally, a protective film 14 is formed.

It is to be noted that FIGS. 1 to 10(*e*) are cross-sectional views showing lengths (in a horizontal direction on the drawing plane) and thicknesses (in a vertical direction on the drawing plane) by way of example, but the invention is not limited to the examples shown in the figures. The low-porosity parts, terminal electrodes, wiring electrode, and the like have predetermined lengths in a width direction (a direction perpendicular to the drawing plane) of the capacitor, and may be present over the entire width of the capacitor, or present only partially over the width.

Figure 11A:
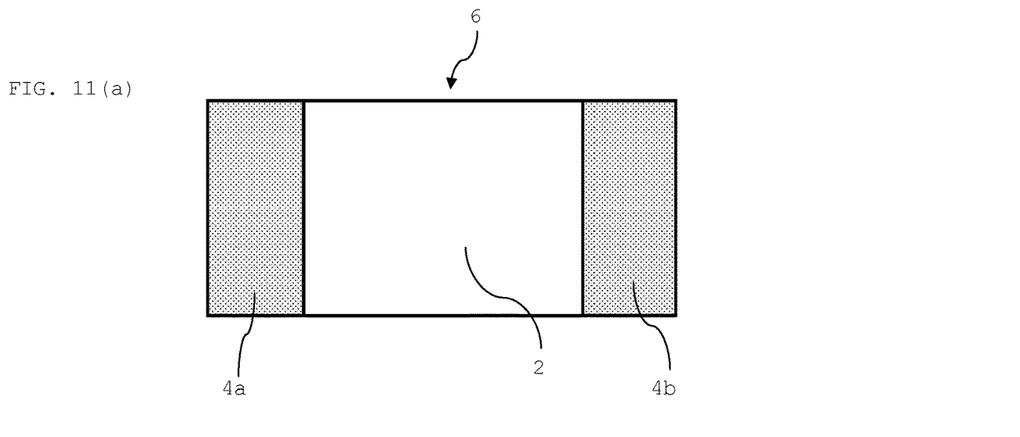
FIGS. 11(a) to 11(c) are schematic cross-sectional views of various configurations of the porous base material of embodiments of the present invention.
Figure 11B:
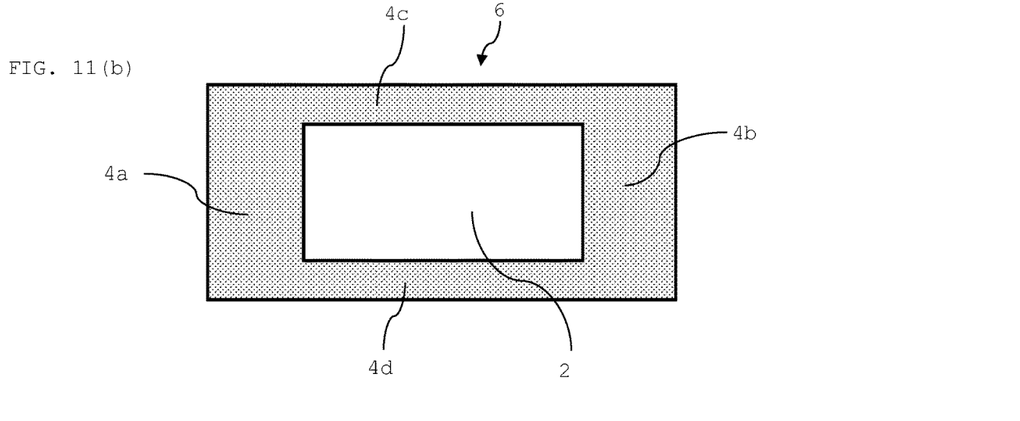
Figure 11C:
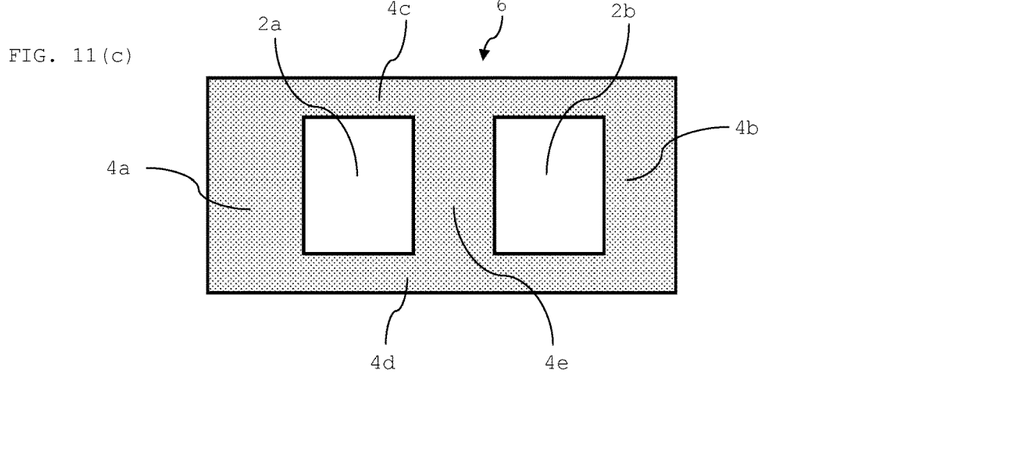

Next, as shown in FIGS. 11(a) to 11(c), the porous base material 6 can have various configurations. As described with respect to FIG. 1, and shown in FIG. 11(a), the porous base material 6 can have low-porosity parts 4a and 4b at opposed side surfaces of the high-porosity part 2. In addition, and as shown in FIG. 11(b), the porous base material 6 can be constructed such that the high-porosity part 2 is centrally located and low-porosity parts 4a, 4b, 4c and 4d (first to fourth parts) are located around the high-porosity part 2 such that the low-porosity parts 4a-4d (first to fourth parts) surround the high-porosity part 2. This results in the structure shown in FIG. 11(b) having a first porosity part (i.e., a high-porosity part) surrounded by a second porosity part (i.e., a low-porosity part) having first to fourth parts 4a, 4b, 4c and 4d.

Further, and as shown in FIG. 11(c), the embodiment of the porous base material in FIG. 11(b) can be modified to include an additional low-porosity part 4e. Similar to the low-porosity part 26 shown in FIG. 7, the additional low-porosity part 4e is separated from the low-porosity parts 4a and 4b present at the pair of opposed side surfaces of the porous metal base material 6, and is formed to extend from the upper surface of the porous metal base material 6 to the lower surface thereof and connect to the low-porosity parts 4c and 4d. This additional low-porosity part 4e may be located in any position in the porous metal base material 6, but is preferably located in a central part thereof as shown so as to define two high-porosity parts 2a and 2b (i.e., first and second parts). This results in the structure shown in FIG. 11(c) having a first porosity part (i.e., a high-porosity part) having first and second parts 2a and 2b, and a second porosity part (i.e., a low-porosity part) having third to seventh parts 4a, 4b, 4c, 4d and 4e.

As would be appreciated by those skilled in the art, the high-porosity parts and the low-porosity parts are not particularly limited in terms of location, the number of parts, size, shape, and ratio between both the high-porosity parts and the low-porosity parts. Further, each of the configurations shown in FIGS. 11(a) to 11(c) can be manufactured in accordance with the methods described herein, and/or combined with the various embodiments depicted, for example, in FIGS. 1 and 4-9(b).

EXAMPLES

Example 1

Prepared as the porous metal base material was commercially available aluminum etching foil for aluminum electrolytic capacitor with a thickness of 110 μm and an expanded surface ratio of approximately 400 times (FIG. 3-1(a)). This aluminum etching foil was subjected to pressing from the top and bottom of the foil with a width of approximately 100 μm at an interval of 1.0 mm×0.5 mm, thereby forming a low-porosity part (FIG. 3-1(b)).

Of the low-porosity part formed as described above, a part to serve as one side surface of a capacitor was cut by a laser (FIG. 3-1(c)). After the cutting, a film of $AlO_x$ (x is 1.2 or more) of 30 nm in thickness was deposited by an ALD method on the porous metal base material to form a dielectric layer (FIG. 3-1(d)).

Next, a mask was applied to the top and bottom of the low-porosity part not subjected to the foregoing cutting (FIG. 3-2(e)), and a film of TiN to serve as an upper electrode was formed by an ALD method on the dielectric layer formed above, and a Ni film was then formed by a plating method in pores and on the surface of the porous foil surface to form a wiring electrode (FIG. 3-2(f)).

Next, the low-porosity part coated with the mask was cut (FIG. 3-2(g)). Then, the mask was removed by heat treatment at 400 to 600° C. (FIG. 3-2(h)).

Next, a protective layer of $SiO_2$ was formed by a CVD method such that the entire surface of the chip was covered with a thickness of 1 μm on average (FIG. 3-3(i)). Then, the protective layer on both ends of the element was etched with a fluorine-based gas (FIG. 3-3(j)), and Ni of 5 μm in thickness was formed by plating thereon, and Sn of 3 μm was formed by plating thereon (FIG. 3-3(k)), thereby preparing a capacitor in the form of a chip as shown in FIG. 1.

For the capacitor prepared as described above, the porosity was measured as follows.

Roughly central parts of the high-porosity part and low-porosity part in the capacitor were made into thin sections with the use of a processing method of micro-sampling with FIB such that the samples of the thin sections were approximately 50 nm in thickness, thereby preparing analysis samples. It is to be noted that damaged layers at the sample surfaces, which were formed during the FIB processing, were removed by Ar ion milling. In regard to the processing for the analysis samples, SMI3050SE (from Seiko Instruments Inc.) for the FIB was used, and PIPSmodel691 (from Gatan, Inc.) was used for the Ar ion milling.

Areas 5 μm×5 μm of the samples were observed with a scanning transmission electron microscope (STEM). For the STEM, JEM-2200FS (from JEOL) was used (accelerating voltage=200 kV). The observed regions were subjected to image analysis to obtain the porosity. As a result, the porosity of the high-porosity part was 60%, whereas the porosity of the low-porosity part was 10%

Example 2

A capacitor according to Example 2 was prepared in the same way as in Example 1, except that commercially available aluminum etching foil for aluminum electrolytic capacitor with a thickness of 110 μm and an expanded surface ratio of approximately 400 times was prepared as a porous metal base material, and irradiated with a $YVO_4$ laser (laser output: 10 W, processing speed: 100 mm/second) to fill holes, thereby forming low-porosity parts.

As a result of the image analysis as in Example 1, the porosity of the high-porosity part was 60%, whereas the porosity of the low-porosity part was 20%.

The capacitor according to the present invention is high in mechanical strength, and thus used for various electronic devices in a preferred manner.

DESCRIPTION OF REFERENCE SYMBOLS 1 capacitor
2 high-porosity part
4 low-porosity part
6 porous metal base material
8 dielectric layer
10 upper electrode 12 wiring electrode
14 protective film
16 first terminal electrode
18 second terminal electrode
20 cut section
22 mask
24 low-porosity part
26 low-porosity part
28 low-porosity part

The invention claimed is:

1. A capacitor comprising:
   a porous metal base material, the porous metal base material comprising at least one first porosity part and at least two second porosity parts opposed to each other with the at least one first porosity part therebetween, the at least one first porosity part having a higher porosity than the at least two second porosity parts;
   a dielectric layer on the porous metal base material;
   an upper electrode on the dielectric layer;
   a first terminal electrode electrically connected to the porous metal base material; and
   a second terminal electrode electrically connected to the upper electrode.

2. The capacitor according to claim 1, wherein the first terminal electrode and the second terminal electrode are respectively located on a pair of opposed side surfaces of the porous metal base material, each of the opposed side surfaces being one of the at least two second porosity parts, and the first terminal electrode and the second terminal electrode each extending from the side surface of the porous metal base material to opposed upper and lower surfaces of the porous metal base material.

3. The capacitor according to claim 2, further comprising a third porosity part between the at least two second porosity parts, the at least one first porosity part having a higher porosity than the third porosity part.

4. The capacitor according to claim 3, wherein the third porosity part connects the at least two second porosity parts opposed to each other.

5. The capacitor according to claim 3, wherein the third porosity part is separated from the at least two second porosity parts that are opposed to each other, and extends from the upper surface to the lower surface of the porous metal base material.

6. The capacitor according to claim 1, further comprising a third porosity part between the at least two second porosity parts, the at least one first porosity part having a higher porosity than the third porosity part.

7. The capacitor according to claim 6, wherein the third porosity part connects the at least two second porosity parts opposed to each other.

8. The capacitor according to claim 6, wherein the third porosity part is separated from the at least two second porosity parts that are opposed to each other, and extends from an upper surface to a lower surface of the porous metal base material.

9. The capacitor according to claim 1, further comprising at least one third porosity part arranged along an upper surface of the porous metal base material, the at least one first porosity part having a higher porosity than the third porosity part, and at least one of the first terminal electrode and the second terminal electrode extends over the third porosity part.

10. The capacitor according to claim 1, wherein the at least two second porosity parts include first to fourth parts that surround the first porosity part.

11. The capacitor according to claim 1, wherein the at least one first porosity part includes first and second parts, and the at least two second porosity parts include third to seventh parts positioned so as to surround the first and second parts.

12. A method for manufacturing a capacitor, the method comprising:
    preparing a porous metal base material comprising a first porosity part and at least two second porosity parts opposed to each other with the first porosity part therebetween, the first porosity part having a higher porosity than the at least two second porosity parts;
    forming a dielectric layer on the porous metal base material;
    forming an upper electrode on the dielectric layer;
    forming a first terminal electrode that is electrically connected to the porous metal base material; and
    forming a second terminal electrode that is electrically connected to the upper electrode.

13. The method for manufacturing a capacitor according to claim 12, wherein the dielectric layer is formed by an atomic layer deposition method.

14. The method for manufacturing a capacitor according to claim 13, wherein the upper electrode is formed by an atomic layer deposition method.

15. The method for manufacturing a capacitor according to claim 12, wherein the upper electrode is formed by an atomic layer deposition method.

16. The method for manufacturing a capacitor according to claim 12, wherein the at least two second porosity parts of the porous metal base material are formed by pressing.

17. The method for manufacturing a capacitor according to claim 12, wherein the at least two second porosity parts of the porous metal base material are formed by a laser.

* * * * *